United States Patent [19]
Duque-Anton et al.

[11] Patent Number: 5,519,884
[45] Date of Patent: May 21, 1996

[54] CELLULAR MOBILE RADIO SYSTEM UTILIZING PREDETERMINED CHANNEL LISTS

[75] Inventors: Jesus-Manuel Duque-Anton; Dietmar W. Kunz; Bernhard J. Rüber, all of Nürnberg, Germany

[73] Assignee: U.S. Philips Corporation, New York, N.Y.

[21] Appl. No.: 146,766

[22] Filed: Nov. 2, 1993

[30] Foreign Application Priority Data

Nov. 2, 1992 [DE] Germany ............... 42 36 982.7

[51] Int. Cl.⁶ ............................................... H04Q 7/24
[52] U.S. Cl. ................. 455/33.1; 455/62; 455/56.1; 379/59
[58] Field of Search ................... 455/33.1, 34.1, 455/34.2, 54.1, 56.1, 62, 67.3; 379/58–59, 61–63

[56] References Cited

U.S. PATENT DOCUMENTS

| | | | |
|---|---|---|---|
| 5,093,927 | 3/1992 | Shanley | 455/34.1 |
| 5,222,247 | 6/1993 | Breeden | 455/67.3 X |
| 5,276,730 | 1/1994 | Cimin, Jr. et al. | 455/33.1 X |
| 5,280,630 | 1/1994 | Wang | 455/67.3 X |

FOREIGN PATENT DOCUMENTS

0202485  11/1986  European Pat. Off. .
0488173   6/1992  European Pat. Off. .

*Primary Examiner*—Reinhard J. Eisenzopf
*Assistant Examiner*—Philip J. Sobutka
*Attorney, Agent, or Firm*—Michael J. Balconi-Lamica; Leroy Eason

[57] ABSTRACT

In a cellular mobile radio network a limited number of available channels must be allocated among the various cells, and the efficiency of such allocation is highly variable with changing traffic conditions in the network. To solve this problem the invention determines all possible radio situations which may arise in the network, including the radio positions of a mobile station and occupancy of the various channels. The individual components of each possible radio situation are then compared with predetermined thresholds so as to reduce the multiplicity of such situations to a relatively small number of classified radio situations each of which has its own channel list allocated thereto. When a channel is requested for a mobile station, the relevant classified radio situation is determined and channel assignment is made from the channel list applicable to that classified situation.

6 Claims, 5 Drawing Sheets

| | | | | | | | |
|---|---|---|---|---|---|---|---|
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 0 | 0 | 0 |
| 0 | 1 | 0 | 0 | 0 | 1 | 0 | 0 |
| 0 | 1 | 0 | 1 | 0 | 0 | 0 | 0 |
| 0 | 1 | 1 | 0 | 0 | 0 | 0 | 0 |
| 0 | 1 | 1 | 1 | 0 | 0 | 0 | 0 |
| 1 | 0 | 0 | 0 | 1 | 0 | 0 | 0 |
| 1 | 0 | 0 | 1 | 0 | 0 | 0 | 0 |
| 1 | 0 | 1 | 0 | 0 | 0 | 0 | 0 |
| 1 | 0 | 1 | 1 | 0 | 0 | 0 | 0 |
| 1 | 1 | 0 | 0 | 0 | 0 | 0 | 0 |
| 1 | 1 | 0 | 1 | 0 | 0 | 0 | 0 |
| 1 | 1 | 1 | 0 | 0 | 0 | 0 | 0 |
| 1 | 1 | 1 | 1 | 0 | 0 | 0 | 0 |

FIG. 4

| C | P | N |
|---|---|---|
| 1 | 0,00 | 0 |
| 2 | 0,00 | 0 |
| 3 | 0,00 | 0 |
| 4 | 0,00 | 0 |
| 5 | 0,00 | 0 |
| 6 | 0,00 | 0 |
| 7 | 0,00 | 0 |
| 8 | 0,00 | 0 |

FIG. 5

| C | P | N |
|---|------|---|
| 1 | 0,00 | 1 |
| 2 | 0,00 | 0 |
| 3 | 0,00 | 0 |
| 4 | 0,00 | 0 |
| 5 | 0,00 | 0 |
| 6 | 0,00 | 0 |
| 7 | 0,00 | 0 |
| 8 | 0,00 | 0 |

FIG. 6

| C | P | N |
|---|------|---|
| 1 | 0,00 | 1 |
| 2 | 0,00 | 1 |
| 3 | 0,50 | 1 |
| 4 | 0,00 | 0 |
| 5 | 0,00 | 0 |
| 6 | 0,00 | 0 |
| 7 | 0,00 | 0 |
| 8 | 0,00 | 0 |

FIG. 7

| C | P | N |
|---|------|---|
| 1 | 0,00 | 1 |
| 2 | 0,00 | 1 |
| 3 | 0,00 | 1 |
| 4 | 0,00 | 1 |
| 5 | 0,00 | 1 |
| 6 | 0,50 | 1 |
| 7 | 0,00 | 0 |
| 8 | 0,00 | 0 |

FIG. 8

CELLULAR MOBILE RADIO SYSTEM UTILIZING PREDETERMINED CHANNEL LISTS

BACKGROUND OF THE INVENTION

1. Field of the Invention

The invention relates to a cellular mobile radio system comprising fixed stations and mobile stations, in which system a radio channel in a radio cell is allocated via a channel list. The invention likewise relates to a controller for a fixed station of such a mobile radio system.

2. Description of the Related Art

Mobile radio systems for covering rather large coverage areas have been structured as cellular radio networks for a rather long time. Each cell of such a radio network comprises at least one fixed station which provides the radio connection to the mobile stations located in its radio cell. A special importance is attached to radio network planning in order to make the available frequency band for the radio system accessible to a maximum number of users in the whole system.

In the radio network planning each fixed station is allocated a limited selection of radio channels from the total number of available radio channels. In adjacent radio cells mutually different interference of channels are used, so that radio channels with each other can be avoided. Due to the limited width of the frequency band, however, the radio channels in the whole radio network must be reused as often as possible to obtain maximum user capacity. The ratio of the total number of radio cells to the number of times the same set of frequencies are re-used is denoted here as the re-use factor.

When a channel needs allocation plan is made, also the channel need of each radio cell must be considered. The channel need of a radio cell is determined by the size of the radio cell and the radio traffic to be expected in that cell. For example, more radio channels are needed in the coverage area of a large city than in an entirely rural area. Partly for this reason, there are already radio cells of variable size. In so-called small cells, which are accordingly of reduced transmitter power, it is possible to re-use a radio channel at a rather small distance from the small cell.

The distance these radio cells are to be kept apart to avoid radio interference depends on many factors. These factors are, for example, the transmitter power and the conditions concerning radio wave propagation. The conditions concerning radio wave propagation are especially the result of shadows, bends, scatterings, reflections and multipath propagation on the radio transmission path.

When radio cells are planned, topographical data (such as differences in height, buildings and so on) are modelled by statistical methods, or the data are collected by measurements taken during rides with instrument cars to allow for requirements concerning radio wave propagation. By implementing methods such as, for example, graph colouring, mutually interfering radio channels can be allocated to radio cells which are sufficiently far apart. In this manner a specific number of radio channels is fixedly allocated to each radio cell as a channel list from the beginning. If there is a request for a channel for communication with a particular mobile station, an arbitrary free channel is selected from the allocated channel list of such cell.

In contrast, with the so-termed dynamic channel allocation methods, it is tested only when a channel is to be selected whether such channel is compatible with the channel seizure occurring in the network at that moment. If it is not compatible, a following channel is selected. Since the channel compatibility is to be tested for each individual case, a dynamic channel allocation method can extend the channel list allocated to each radio cell to all the available channels.

EP 0 202 485 A2 has disclosed a dynamic channel allocation method which is also known by the name of channel segregation. With this method each channel is additionally assigned a priority. When there is a request for a channel, the channels are searched for their compatibility with a descending priority. If a channel is available its priority is increased; if a channel is not available, its priority is reduced. By giving priority to the channels, there is achieved that the order in which the channels in the individual radio cells are searched is constantly changed, while in each radio cell the channels having a high priority are given preference. By increasing or reducing the priorities, there is a possibility for the channel allocation in the radio network to be optimized or reorganized.

When there is a limited number of channels available, the increase of the number of radio channels allocated to a particular radio cell is always at the cost of the available channels in the adjacent radio cells. Due to the enhancing need for mobile communication, both the already existing mobile radio networks and those being laid out will in the near future reach their capacity limits.

Only by the simplifications realised on the basis of statistics can the planning according to known methods be kept within justifiable limits. But especially with small cells the statistical simplifications are no longer tolerable, because the calculated data become increasingly unreliable. Minor changes of the infrastructure of a small radio cell, even if they are of a momentary nature, may lead to a completely different situation from the point of view of radio engineering or traffic load, so that regular operation of the radio cell cannot be maintained with the preplanned data.

For example, road construction causing a constant traffic backup also causes the number of participants in the (radio) traffic in a cell to increase drastically. Since it is impossible to have a sufficient number of channels available in each radio cell for any conceivable situation, due to the limited number of available channels, modified radio and (radio) traffic situations lead to overloaded radio cells and the attendant disadvantages, such as rejecting a request for a call or terminating a call due to the lack of a free channel.

SUMMARY OF THE INVENTION

It is an object of the invention to provide in a mobile radio system of the type defined in the opening paragraph method of optimizing the channel assignments in the radio network during operation.

This object is achieved in that various possible radio situations are detected and classified and each classified radio situation has its own channel list.

Depending on which circuitry seems to be justified, a radio situation may be determined by space-dependent components or time-dependent components or by a combination thereof. The space-dependent component relates to the radio position of a mobile station. The radio position of a mobile station may be determined, for example, by means of signal strength measurements. The time-dependent component is the instantaneous channel situation, for example, the actual channel occupancy. A classification, for example, by a comparison of the individual components with predetermined thresholds, reduces the multiplicity of possible radio situations to a small number of classified radio situations. Each one of these classified radio situations has its own channel list. With a request for a channel, for example for setting up a connection for a call or for handing over a call to another cell, a channel is selected from the channel list which is assigned to the actual radio situation existing at that moment.

The channel list adapted to a particular radio situation need not of necessity contain channels which are different from those of the other channel lists. The channel lists may be distinguished, for example, by different allocation methods or a different priority of the channels they contain.

With the different channel lists channels can be allocated in response to occurrence of a previously analyzed radio situation. Since the channel allocation in essence determines the network behaviour, the network behaviour can be adapted to different network situations simply by allocating different channel lists. The network resources which are available only to a limited extent can thereby be distributed among those parts of the network where they are needed most.

This has a specially advantageous effect on the traffic capacity and the operation reliability of the network.

In a preferred embodiment of the invention a dynamic channel allocation method is used to allocate channels.

Dynamic channel allocation methods such as, for example, the so-termed channel segregation method renew the utilized channel list with each channel allocation. As a result, it is possible to have a long-term adaptation to the traffic situation found; but changing traffic situations prevent an optimum channel list to be drawn up, because the channel list must adapt constantly to the changing traffic situation.

A highly advantageous effect on the dynamic channel allocation method is especially achieved in that for specific selected radio situations a corresponding number of channel lists is available for each channel allocation method. If the radio situation changes, the unselected channel lists remain unaffected and make it thus possible, if one of these channel lists is selected, to continue at the same position at which a channel list was left. With constantly changing radio situations this first provides the requirement that the channel list be converged to an optimum value. If the actual radio situation changes, the channel list to be selected is immediately available, so that also a considerably faster reaction to changes of the radio situation is possible than with the long-term components of a customary dynamic channel allocation method.

Dynamic channel allocation methods provide a possibility of allocating radio channels while the network is in operation. Therefore, it is no longer necessary to precalculate or estimate respectively, in a planning step all the radio situations such as, for example, traffic density and information on compatibility. Since the channel allocations are now no longer based on uncertain planning data, the number of calls lost is reduced and the call quality increased. With the various channel lists provided for the respective radio situations it is possible for such a radio network to adjust very rapidly, without a renewed planning, to changed propagation and traffic conditions, without discarding the previous radio situations.

To detect the space-dependent components of a radio situation, it is advantageous also to take into account the fixed stations of other radio cells, preferably of the adjacent radio cells.

Other fixed stations may be included, on the one hand, in that a mobile station measures radio engineering parameters of other fixed stations and/or, on the other hand, in that the fixed stations measure the radio engineering parameters of the mobile stations located in other radio cells. Ideally then, all the fixed stations located in the radio network are to be included. However, depending on the application, only a specific number of other fixed stations, for example, only the nearest fixed stations, need be included.

In the simplest case the field strength with which one mobile station receives other fixed stations or the other fixed stations receive the mobile station is sufficient to measure and evaluate radio engineering parameters. Further factors can be used, for example, a signal-to-noise ratio, the distance between mobile station and fixed stations, and so on.

Classification thus produces virtual sub-cells, and similar radio engineering ratios can be determined for a sub-cell. A sub-cell can, but need not of necessity, correspond to a specific regionally coherent area of the radio cell.

Satisfactory results may be achieved if signal strength is used as a radio engineering parameter. Preferably, the measured signal strengths can be combined into a signal strength vector with, for example, the first element of this signal strength vector denoting the signal strength of its own fixed station and the other elements the signal strengths of the other fixed stations.

Especially advantageous is setting the measured signal strengths of the adjacent fixed stations in proportion to the measured signal strength of the fixed station of its own radio cell. The result is indicative of a mobile station's interference situation. If the measured signal strengths are logarithmically weighted for this purpose, a ratio vector is obtained wherein the first element of the signal strength vector is subtracted from all the other elements. Since this ratio vector is a reflection of the interference situation of the mobile station, this vector will henceforth be referenced as the interference vector.

Especially advantageous for the classification is to compare the proportioned signal strengths with a threshold that depends on the radio system. This threshold, which depends on the radio system, is for example the maximum permissible common channel signal-to-noise ratio. When this threshold is exceeded there is probably interference, which interference, however, is unlikely if the threshold is not reached. Depending on whether the threshold is exceeded or not, two messages "interference" and "no interference" can occur. During a call it is thus possible to provide a compatibility vector for each mobile station.

All the mobile stations in a radio cell having the same compatibility vector are assigned to the same sub-cell. By means of assignment Tables it is also possible to combine a plurality of different compatibility vectors to one sub-cell. In this manner, it is possible to combine, as appropriate, a plurality of sub-cells having the same interference situation. This is advantageous, for example, when the combined sub-cells themselves have little traffic load. By combining corresponding sub-cells it is possible to form sub-cells with substantially the same traffic load, so that the available channels can be used uniformly and thus better.

For detecting the radio situation with respect to a time variant component of the channel space (channel situation), it is especially suitable to consider the radio engineering parameters of all the available channels.

Qualitative considerations such as "channel in use"/"channel not in use", as well as quantitative considerations such as, for example, the measurement of the bit error rate of each channel, can be used as radio engineering parameters. By evaluating each individual channel, for example by comparing the channel with limit values, each channel can be classified. In the simplest case two messages "no interference on channel" and "interference on channel" can be used for the classification. It is again possible here, for example, by assignment Tables, to combine similar channel situations to reduce the number of channel situations to be taken into consideration.

Each channel situation detected in this manner is the result of the influence by other radio cells as long as they have an interfering effect on the radio cell under consideration and on the traffic activity in the radio cell under consideration. By collecting and evaluating the channel situations centrally, these influences may be separated from each other and the channel situation may be described by the separate factors.

Since also the current location of a mobile station can be determined when the channel situation is evaluated, the channel situation in a radio cell may be found out locally by relating the channel situation to the location of the mobile station. The maximum number of different radio situations thus corresponds to the product of the number of local situations and the number of channel situations to be distinguished.

In a possible embodiment of the invention the call quality during an existing call can be evaluated.

For example, the signal-to-noise ratio or the bit error rate can be used as evaluation criteria. It has appeared that at the beginning, and also in the event of changes in the network, channel allocations of insufficient quality may occur. Therefore, additional quality tests, preferably performed at regular time intervals, add in essence to the stability of the channel distribution.

With such a test there may be simultaneously verified whether the quality of the link has deteriorated to such an extent that a call transfer to another channel or another radio cell is to take place. It is advantageous in this respect to hand over a call only if the new channel has reached a specific quality. As a result of such a distance between the quality value at which a call is handed over and the quality value of the new channel which admits the handed over call first, a much too frequent call hand over may be prevented.

Furthermore, it is advantageous also to provide a specific minimum quality value at which a connection is broken off. A connection is always broken when the call quality no longer allows a usable connection and when no channels are available for a connection in the situation at hand.

By changing these limit values the network response can be brought in line on a long-term basis with a specific behaviour. The target behaviour may be, for example, a capacity increase, a quality optimization, a stabilization of the network or any combination of these target behaviours. Depending on the desired target behaviour, the reaction to a change of such a limit value is monitored by a suitable evaluation, for example, with a cost function. The combination of systematically performed hand-overs may thus lead the network behaviour to the target behaviour while the network response is taken into consideration.

BRIEF DESCRIPTION OF THE DRAWINGS

In the following the invention will be further described and explained with reference to a preferred embodiment as shown in the drawings, in which.

DESCRIPTION OF THE PREFERRED EMBODIMENTS

The preferred embodiment is described with reference to integration thereof in a mobile radio network according to the pan-European digital mobile radio system GSM known in the art. A survey of the GSM system is found, for example, in "AN OVERVIEW OF THE GSM SYSTEM", Bernard J. T. Mallinder, Conference Proceedings, Digital Cellular Radio Conference, Oct. 12–14, 1988, Hagen, Federal Republic of Germany, pp. 1a/1–1a/13.

In the GSM system the frequency band from 890 to 915 MHz is used for the communication from a mobile station to a fixed base station (uplink) and from 935 to 960 MHz for the communication from base station to mobile station (downlink). Each such 25 MHz frequency band includes carrier frequencies which have a 200 kHz carrier frequency spacing thus providing 125 radio channels. Each of these channels is accessed in the time-division multiplex mode by way of a multiple access method, so that in each frequency band eight user channels are available in eight time slots. The encoding of the individual user channels, the subdivision of the frequency channels into time slots and the allocation of the user channels to the individual radio channels is sufficiently known in this field, so that these details are not further discussed.

Figure 1:
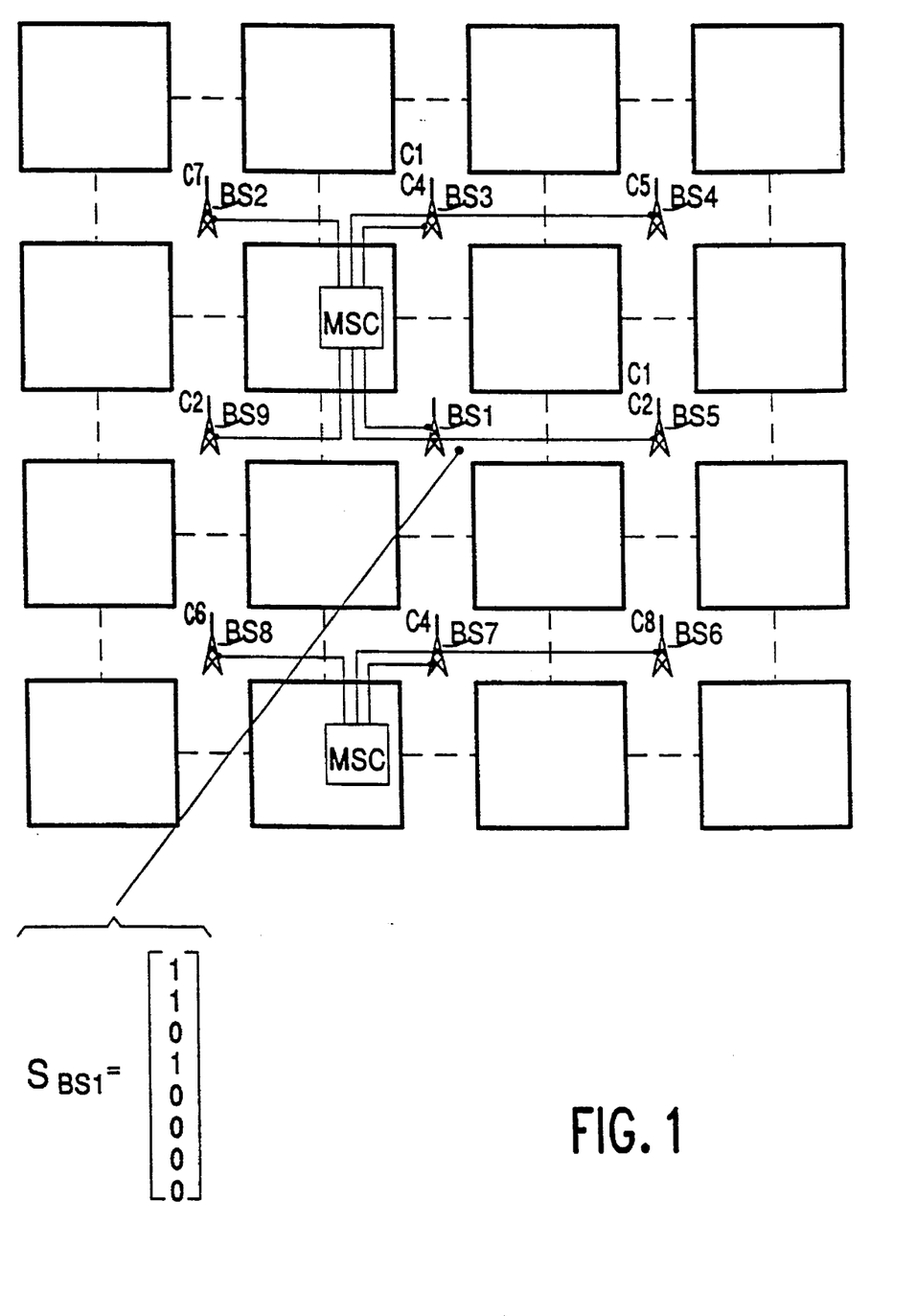
FIG. 1 shows the structure of a small-cell radio network with channel seizure and an interference vector derived therefrom to describe the time-dependent components of the radio situation.
Figure 2:
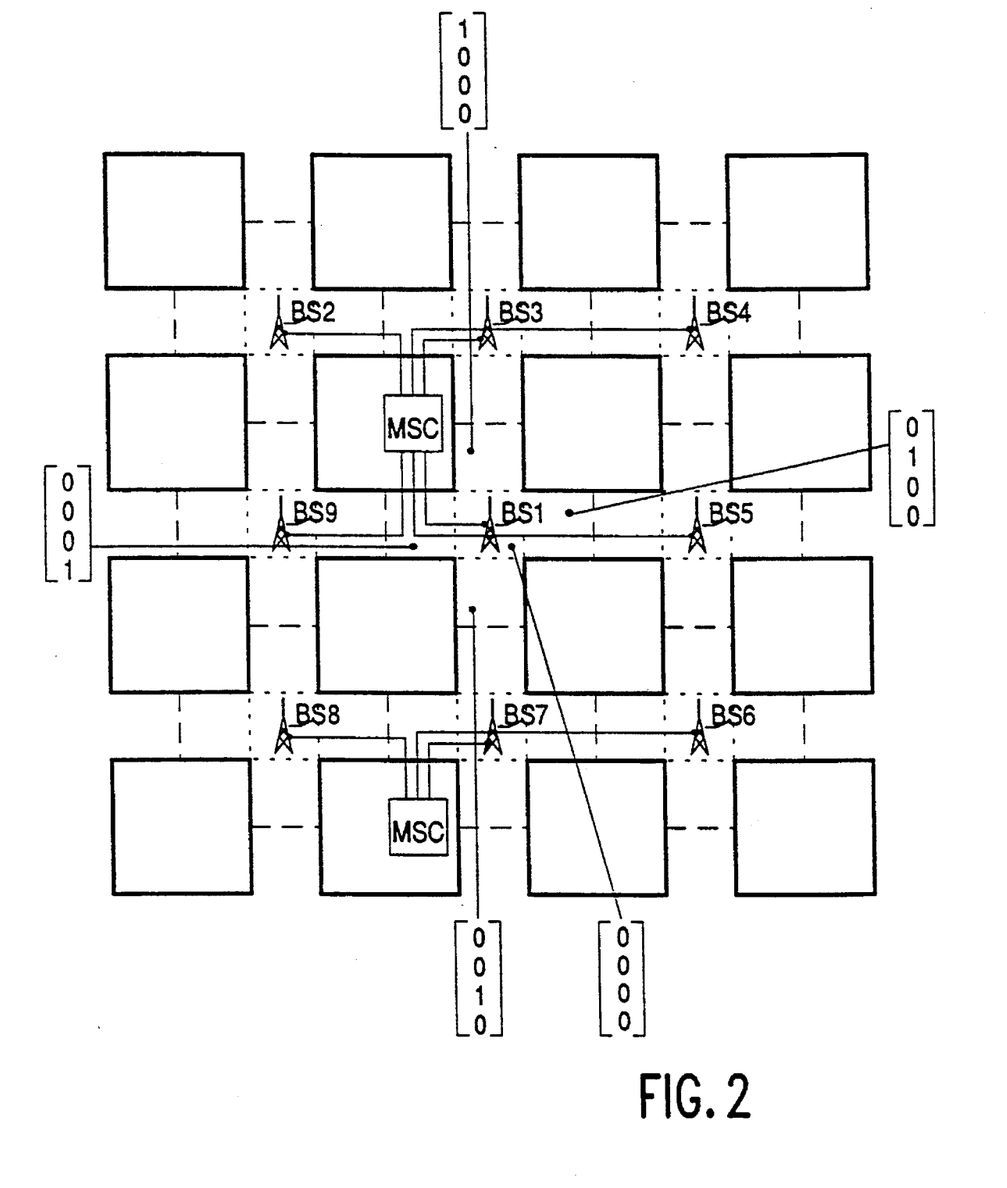
FIG. 2 shows the same model as FIG. 1 with formation of sub-cells for locally solving the radio situation.

FIG. 1 shows the structure of a small cell radio network in a large city. To overcome the problem of high traffic density in a large city small radio cells are formed, so that the traffic load per cell is accordingly reduced due to the small coverage area of a small radio cell. FIG. 1 is an idealized model which is based on horizontally and vertically running streets with tall buildings erected along the streets. Since such an infrastructure is found, for example, in the Manhattan district of New York, this model is called the Manhattan model.

At each intersection there is a fixed station BS1 . . . BS9. As a result of the buildings erected along the streets, radio wave propagation between streets running in parallel is avoided. The radio waves can thus propagate only in the direction of the streets. In the GSM system a plurality of fixed stations is controlled by a central control arrangement. Since this central control arrangement additionally comprises the network junction between the mobile radio system and the wired telephone communication system, the central arrangement is called a mobile switching centre (MSC).

In order not to become too complex, the illustrated embodiment starts from eight radio channels C1 . . . C8 in lieu of the actual 125 radio channels. The boundaries of each radio cell are shown in FIG. 1 by dashed lines. To explain the radio situation in a radio cell, the radio channels used by the base station are indicated for each radio cell in FIG. 1.

In the illustrated embodiment it is assumed that the transmitter power in a radio cell is selected such that each radio channel can already be re-used in the second succeeding radio cell. For example, in FIG. 1 the radio channel C4 can be simultaneously used both by the radio cell of base station BS3 and by the radio cell of base station BS7 since. As a result of the shielding by the buildings, however, it is also possible to re-use radio channels of diagonally arranged fixed stations. For example, the channel C1 of both fixed station BS3 and fixed station BS5 can be used simultaneously.

Figure 3:
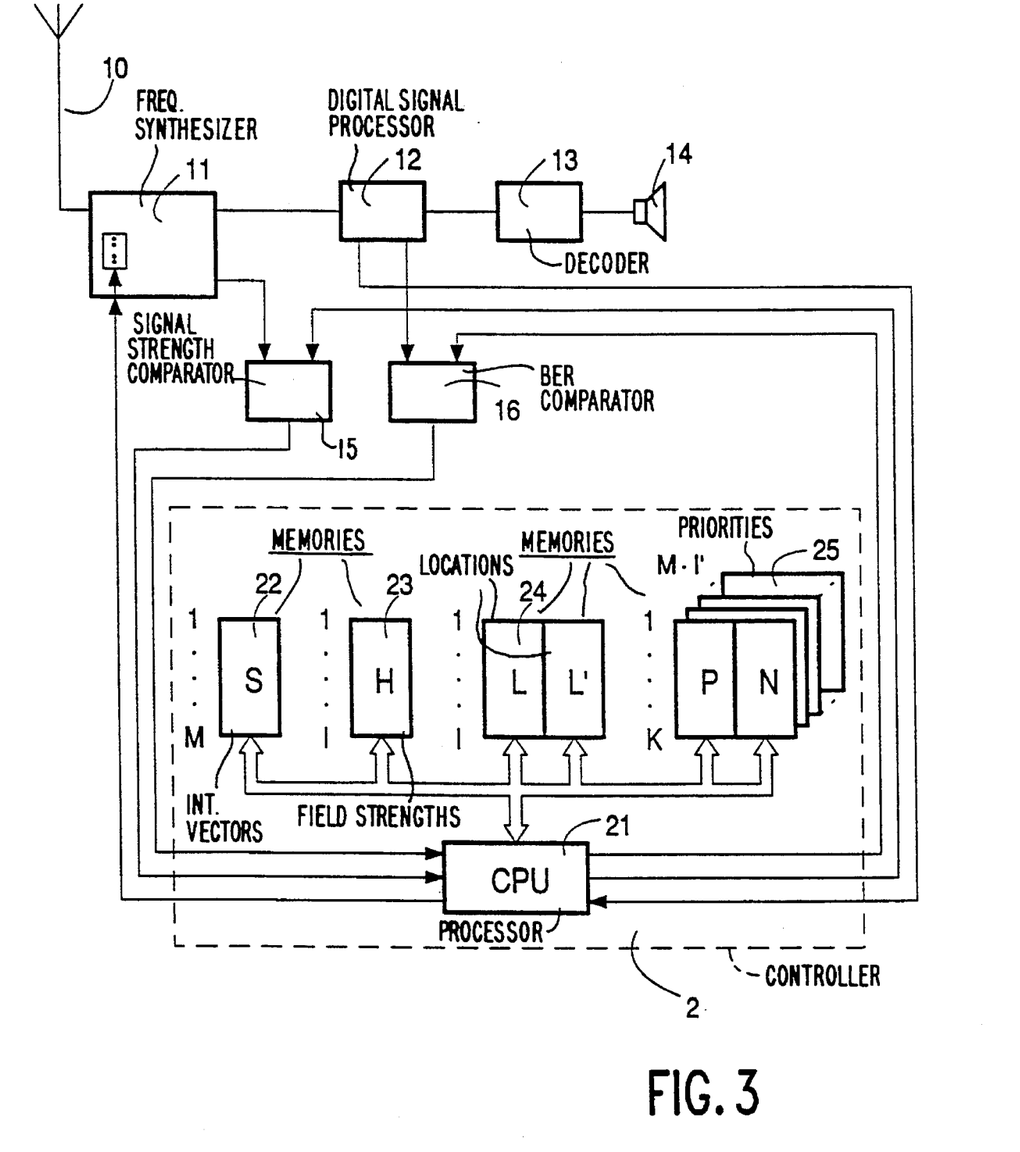
FIG. 3 shows a diagrammatic structure of a radio receiver to implement the invention, with a storage area for each radio situation to be evaluated.

FIG. 3 diagrammatically shows a base station radio receiver by which the radio situation in a radio cell can be detected. In a digital frequency synthesizer stage 11 the receiver can be set to the given radio channel by feeding a radio channel number. The input signal, converted to an intermediate frequency signal, is further converted in a digital signal processor stage 12 to the baseband and converted back into a digital signal. In a low-frequency decoder stage 13 this digital signal is reconverted into a speech signal by decoding, which speech signal can be reproduced via a loudspeaker 14.

The control arrangement concerned is formed by a controller 2 coupled to the radio receiver via appropriate data and control lines. In the illustrated embodiment the control arrangement comprises a program controlled arithmetic unit 21 and various memories 22 to 25.

The frequency synthesizer 11 of the radio receiver is structured so that a signal proportional to the input signal strength is available. This available signal is applied to a first comparator 15 which compares it with a threshold given by the controller 2. The result of the comparison is returned to the central controller 2 of the radio receiver. Furthermore, the digital signal processor stage 12 is provided to determine a bit error rate (BER) of the received signal from redundant data included therein for error detection or error correction. This bit error rate is applied to a second comparator 16 which compares the found bit error rate with a bit error rate also given by the controller 2 and returns the result to the controller 2 of the radio receiver.

The controller 2 comprises a first memory 22 for stiring the detected radio situation S. The number of memory locations M of this first memory 22 corresponds to the number of radio channels taken into consideration when the radio situation was detected. In the illustrated embodiment they are the eight radio channels C1 . . . C8.

For detecting the radio situation S, the central controller 2 consecutively sets each available radio channel at the frequency synthesizer 11. The signal strength of each one of these radio channels is compared with the given threshold by the first comparator 15. This threshold has such a value that if the same is also a radio channel used by the next succeeding cell that leads to a transgression of the threshold, whereas use of such radio channel in the second succeeding radio cell does not lead to a transgression of the given threshold. The output of the first comparator 15 thus corresponds to a logic value which denotes whether a specific radio channel has already been seized or not. The logic output values of the first comparator 15 are stored successively in the first memory 22.

FIG. 1 shows the radio situation $S_{BS1}$ for the radio cell of the base station BS1. The first row corresponds to the first channel C1 and so on. A zero denotes that use of the radio channel concerned will not be disturbed by another radio cell, and a one denotes that use of the relevant radio channel will be disturbed by another radio cell. The first radio channel C1 is used, for example, by the fixed station BS3 arranged above the fixed station BS1 and also by the fixed station BS5 to right of the fixed station BS1. Consequently, use of channel C1 by station BS1 is subject to interference by stations BS3 and BS5, and so the first row of the radio situation vector has thus a one. The radio channel C5, on the other hand, is used only by the fixed station BS4 located to the upper right and diagonally relative to the fixed station BS1, so that the shifting by the buildings located inbetween does not cause any harmful effect. Therefore, the entry on the fifth row of the vector is a zero.

Since the logic values correspond to a message of "interference"/"no interference", this part of the radio situation is referenced as the interference "vector". The separate pans of the interference vector are binary values, and the whole interference vector forms a binary number. In the illustrated embodiment the first element of the interference vector is used as the most significant bit (MSB) and the last part of the interference vector as the least significant bit (LSB). Decimal conversion of the interference vector shown in FIG. 1 produces the decimal number 208.

Furthermore, in the illustrated embodiment the signal strengths with which the four nearest base stations are received are measured to locally evaluate a radio situation.

For distinguishing the nearest base stations from other stations, in the illustrated embodiment each base station transmits information about its adjacent base stations in repetitive control messages. In this embodiment such information comprises the numbers of the radio channels which the adjacent base stations utilize as their control channel. In the GSM system the adjacent base stations are handed over during a call to a so-termed SACCH (slow associated control channel) actually to prepare and carry out a radio cell handover. Through the invention this information is also used for determining the base station's own radio situation. The time-division multiplex frame of the GSM system is structured in such a way that it contains certain time slots occupied neither by a traffic channel nor by a control channel. In these time slots the receiver of the mobile station tunes to the control channels of the adjacent base stations and measures their signal strengths.

The mobile station concerned then transmits the measured signal strengths, together with the signal strength with which its own fixed station is received, to its own fixed station via the SACCH of the mobile station.

The transmitted signal strengths are separated from the SACCH in the digital signal processor stage 12 of the base station and transferred to the controller 2. In the controller 2 these data are buffered in a second memory 23.

Figure 4:
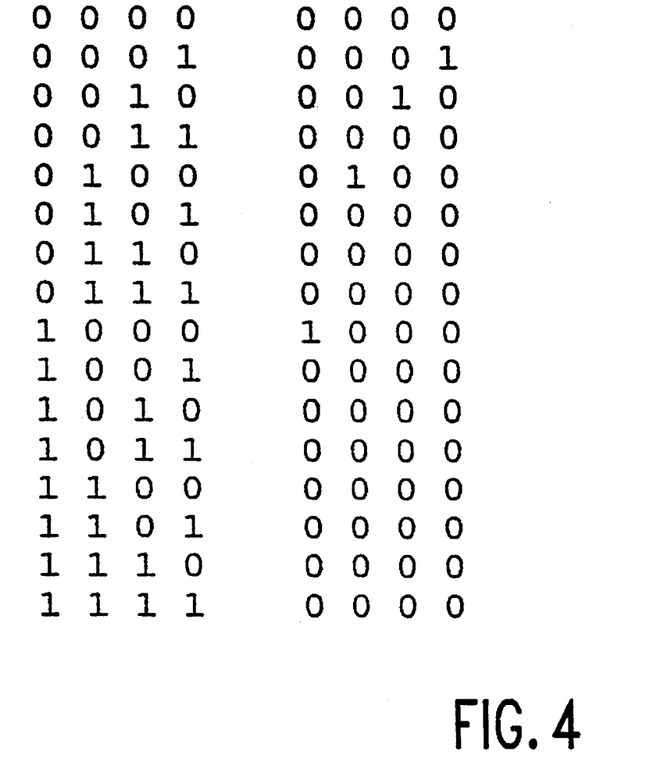
FIG. 4 shows an assignment Table for reducing the local solution to five sub-cells.

During a subsequent evaluation the signal strengths H of the base station's four adjacent base stations are compared with the base station's own signal strength. In the illustrated embodiment it is only necessary to have a coarse indication of the location mobile station, so that when these values are compared with a further threshold it is possible to classify a limited number of different possible radio locations of the mobile stations. Since again a logic value is taken for comparison with a threshold, this type of classification provides $2^4=16$ possible radio locations L. In the illustrated embodiment such located are listed in the assignment Table shown in FIG. 4, which is stored in a third memory 24. From the 16 possible classified radio locations L only five, L'={(0000),(0001),(0010) (0100),(1000)}, are left after the requirement of non-interfering reception. These coarsely determined radio locations L' are listed in the assignment Table in FIG. 4, and each correspond to a specific sub-range portion of the radio cell (BS1).

The overall radio situation can thus be determined from the time-dependent radio interference parameter $S_{OS1}$ and the location parameter L'. For each radio situation the radio receiver has its own storage area for storing a priority list, the number of storage areas corresponding to the product of the time-dependent radio interference situations and the number of classified radio locations. The number of the storage area used is formed from the number of interference the vector and the number of the classified radio location.

Figure 5:
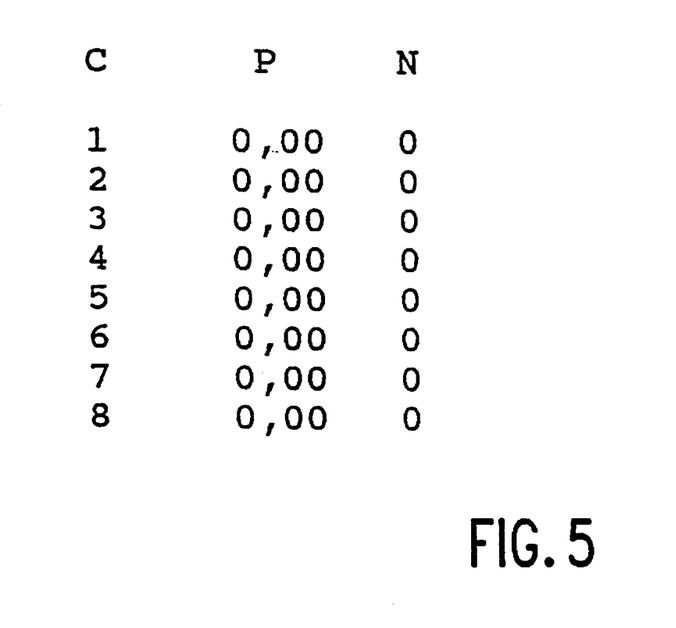
FIGS. 5 to 8 show four different sections of a priority list for a specific radio situation.
Figure 6:
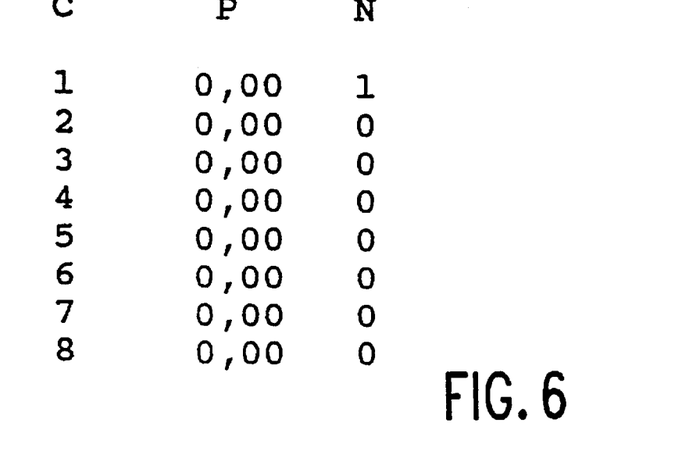

When a channel is to be selected from a classified channel list, the known channel allocation method based on priorities is used. For this purpose each radio channel is assigned a specific priority. Furthermore, the number of accesses N to this radio channel carried out so far is stored for each radio channel. In FIG. 5 it is assumed that in the radio situation concerned there have not yet been any entries on the priority list. All the values of the priority list are therefore set to zero, as is the number of accesses to a radio channel in the radio situation concerned. In case a radio channel is accessed, a radio channel is selected according to its priority. Since all the radio channels have the same priority in the priority list used, the first channel C1 is started with in the illustrated embodiment. Since this channel is already in us by an adjacent cell, it is impossible to set up for base station BS1 a connection with this channel. The channel C1 therefore retains the priority of zero, and the number of accesses to this channel is incremented by one (FIG. 6).

Figure 7:
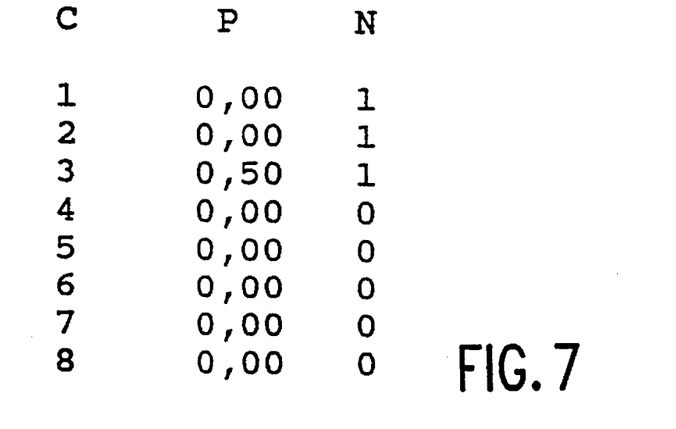

Similarly, the test of use of the channel C2 is unsuccessful. The channel C3, on the other hand, is not used by any other fixed station according to the channel occupation shown in the illustrated embodiment, so that a radio connection can be set up with this-channel. The priority of that particular channel concerned is increased by 0.5 as a result of the successful connection set-up (FIG. 7). During the connection, the bit error rate, which is being formed during the connection, is compared with the threshold by the second comparator 16.

In the illustrated embodiment no common channel interference occurs, it is true, but because the channels C1, C2 and C4 immediately adjacent to channel C3 have already been seized, this may lead to so-termed cumulative interference which, for example, may cause the bit error rate to increase.

Figure 8:
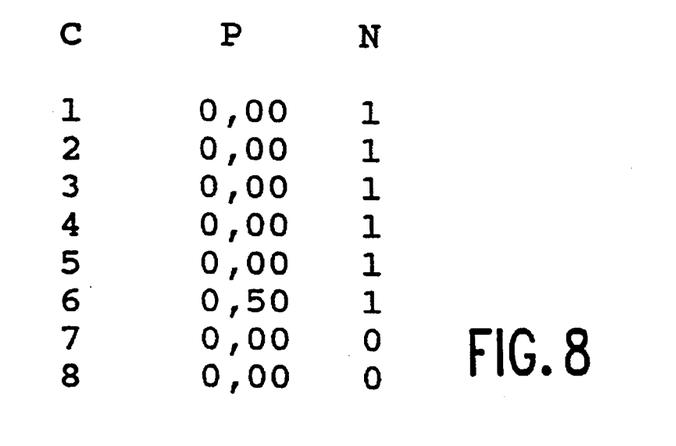

Due to the increased bit error rate as a result of the cumulative interference, the call is handed over to another channel. A handover to the channel C4 is precluded because to that channel is used in the adjacent stations BS3 and BS7. In the following it is also assumed that again the cumulative interference is too large after a call has been handed over to the channel C5. Finally, the channel C6, which has a sufficient spacing to the utilized channels, will be the suitable channel for a sufficient call quality. When there is a channel handover the priority of the originally selected channels is lowered due to the lower call quality. The final channel C6 obtains the highest priority (FIG. 8).

In this manner the priority list utilized for each radio situation will contain channels whose priority is very high compared with the other channels. Since the channels sought for connection are selected in the order of their priority, specific channels will become preferred channels, and there will be different preferred channels occurring in each different radio situation.

The example of the cumulative interference shows very clearly why in each radio situation certain channels are more suitable than other channels. However, the radio situation includes considerably more influences than the cumulative interference. When the radio situation is detected, time-dependent radio parameters such as, for example, peak load during peak time and locally determined long-term change of the volume of traffic, caused by construction works, are automatically detected as changed radio situations and autonomously acquired and regulated.

Further embodiments of the principle according to the invention are obtained, for example, in that the radio situation is measured by the relevant mobile station and transmitted over the control channel to the base station to be evaluated there.

Advantageously, acquired channel allocations are broken up again to adapt faster to changes in the situations. For this purpose, current events may be given more priority than, for example, less recent events.

Obviously, it is up to the user to decide at which locations in a radio system he wishes to carry out the evaluation and allocation functions. The memories described in the illustrated embodiment may also be distributed over other components. Only the described cooperation of such components is important.

We claim:

1. A method of channel allocation for use in a cellular mobile radio system comprising a plurality of base stations and a plurality of mobile stations, the base stations being in respective regional cells, a limited a number of radio channels being provided for communication between the base station and mobile stations in each cell, each channel being concurrently re-usable by base stations of non-adjoining cells; said method consisting of performance periodically of the following steps by the base station of a cell:

(i) for each of a plurality of possible radio communication situations between the base station and a mobile station in said cell, detection of values of at least one space-dependent parameter and at least one time-dependent parameter which affect the quality and availability of radio communication between the base station and the mobile station;

(ii) classification of the detected values of each of said parameters in accordance with whether a predetermined threshold applicable to the relevant parameter is or is not exceeded, and combining the classified parameter values to form a series of classified possible radio communication situations between the base station and the mobile station;

(iii) assignment to each of said classified radio communication situations of a respective list of channels to create a plurality of previously stored available channel lists, which, in the relevant situation, are capable of providing communication between the base station and the mobile station; and (iv) in response to a request for allocation of a channel, the base station detects the existing radio communication situation, determines the applicable classified radio communication situation, and allocates a channel from the plurality of previously stored available channel lists, wherein the channel list applicable to the so determined classified radio communication situation is utilized.

2. A method is claimed in claim 1, wherein in step (iv) the allocation of a channel from the applicable channel list is performed in accordance with channel priorities established by dynamic channel allocation based on previous requests for channel allocations.

3. A method is claimed in claim 1, wherein the detected parameters of a radio communication situation include radio communication parameters of base stations in cells adjoining the cell in which the mobile station is located.

4. A method is claimed in claim 1, wherein the detected parameters of a radio communication situation include radio communication parameters of all channels in said system.

5. A method is claimed in claim 1, wherein the base station evaluates the communication quality of an allocated channel during communication with a mobile station over said channel.

6. A control unit for use in a base station of a cellular mobile radio system which comprises a plurality of base stations and a plurality of mobile stations, the base stations being in respective regional cells, a limited number of radio channels being provided communication between the base station of each cell and mobile stations therein, each channel being concurrently re-usable by base stations of non-interfering cells; said control unit comprising:

a first memory for storing data representing interference vectors corresponding to logic values of relative interference which will occur from adjoining base stations for various possible channel assignments of the adjoining base stations;

a second memory for storing data representing measured signal strengths of channels between base stations of adjoining cells and a mobile station at various different locations (L) in the cell of the base station in which the control unit is situated, and data representing classifications (L') of said locations at which there is substantially no interference from the adjoining base stations; and a central processor for combining the data stored in said first and second memories to derive data representing a series of classified possible radio situations, and assigning to each classified radio situation a list of channels from which a channel can be selected for assignment when an existing radio situation matches the relevant classified radio situation.

* * * * *